United States Patent
Asma et al.

(10) Patent No.: US 12,307,685 B2
(45) Date of Patent: May 20, 2025

(54) SEGMENTATION MASK EXTRAPOLATION

(71) Applicant: QUALCOMM Incorporated, San Diego, CA (US)

(72) Inventors: Qureshi Asma, Thornhill (CA); Darren Gnanapragasam, Aurora (CA); Alireza Shoa Hassani Lashdan, Burlington (CA); David Hansen, Calgary (CA)

(73) Assignee: QUALCOMM Incorporated, San Diego, CA (US)

( * ) Notice: Subject to any disclaimer, the term of this patent is extended or adjusted under 35 U.S.C. 154(b) by 445 days.

(21) Appl. No.: 17/931,859

(22) Filed: Sep. 13, 2022

(65) Prior Publication Data

US 2024/0087140 A1    Mar. 14, 2024

(51) Int. Cl.
G06T 7/215    (2017.01)
G06T 7/194    (2017.01)

(52) U.S. Cl.
CPC .............. G06T 7/215 (2017.01); G06T 7/194 (2017.01); G06T 2207/20081 (2013.01)

(58) Field of Classification Search
CPC .......... G06T 2207/10016; G06T 7/215; G06V 20/49; G06V 20/695
See application file for complete search history.

(56) References Cited

U.S. PATENT DOCUMENTS

| 6,075,875 A * | 6/2000 | Gu ........................ H04N 19/20 375/E7.065 |
| 2003/0128758 A1 | 7/2003 | Prakash et al. |
| 2005/0058344 A1 * | 3/2005 | Xu ........................ H04N 19/21 375/E7.251 |
| 2005/0243932 A1 * | 11/2005 | Landsiedel ............ H04N 19/55 375/240.24 |

(Continued)

FOREIGN PATENT DOCUMENTS

FR    2936925 A1 *    4/2010    .......... H04N 19/117

OTHER PUBLICATIONS

Feng J., et al., "TapLab: A Fast Framework for Semantic Video Segmentation Tapping into Compressed-Domain Knowledge", arXiv:2003.13260v3 [cs.Cv], arxiv.org, Cornell University Library, 201 Olin Library Cornell University Ithaca, NY 14853, Aug. 18, 2020, pp. 1-13, XP081741594, abstract figures 2,3,12,13, section 3.

(Continued)

*Primary Examiner* — Guillermo M Rivera-Martinez
(74) *Attorney, Agent, or Firm* — Polsinelli/Qualcomm

(57) ABSTRACT

Systems and techniques are described herein for processing video data. For instance, a technique can include receiving a first image after a previous image. The process can further include receiving a first segmentation mask associated with the previous image. The process can also include estimating a first set of forward motion vectors between the previous image and the first image. The process can further include estimating a reliability of the first set of forward motion (Continued)

vectors. The process can also include extrapolating a second segmentation mask associated with the first image using the first set of forward motion vectors and first segmentation mask based on the estimated reliability of the first set of forward motion vectors.

30 Claims, 9 Drawing Sheets

(56) References Cited

U.S. PATENT DOCUMENTS

| | | | |
|---|---|---|---|
| 2006/0017843 A1* | 1/2006 | Shi | H04N 7/014 |
| | | | 375/E7.262 |
| 2009/0147851 A1 | 6/2009 | Klein Gunnewiek et al. | |
| 2014/0028793 A1* | 1/2014 | Wiegand | H04N 19/11 |
| | | | 348/42 |
| 2019/0122411 A1* | 4/2019 | Sachs | G06T 7/90 |
| 2019/0139257 A1* | 5/2019 | Choi | G06V 20/46 |
| 2019/0311202 A1* | 10/2019 | Lee | G06T 9/002 |
| 2020/0074642 A1* | 3/2020 | Wilson | G06T 7/174 |
| 2020/0134910 A1* | 4/2020 | Kroon | H04N 13/344 |
| 2020/0137375 A1* | 4/2020 | Kroon | H04N 13/275 |
| 2020/0193609 A1* | 6/2020 | Dharur | G06T 7/143 |
| 2020/0202140 A1* | 6/2020 | Simon | G05D 1/0253 |
| 2021/0082122 A1* | 3/2021 | Takeda | G06N 3/04 |
| 2022/0392116 A1* | 12/2022 | Vembar | G06N 3/045 |
| 2023/0022344 A1* | 1/2023 | Abramyanc | G06T 5/50 |

OTHER PUBLICATIONS

Mao J., et al., "Toward Efficient and Adaptive Design of Video Detection System with Deep Neural Networks", ACM Transactions on Embedded Computing Systems, ACM, New York, NY, US, vol. 21, No. 3, Jul. 19, 2022, pp. 1-21, XP058698720, section 4.2.
Partial International Search Report—PCT/US2023/071230—ISA/EPO—Dec. 5, 2023.
Xu K., et al., "Accelerating Video Object Segmentation with Compressed Video", arXiv (Cornell University), Apr. 6, 2022, pp. 1342-1351, XP093100752, Ithaca, the whole document.
Zhu X., et al., "Deep Feature Flow for Video Recognition", arXiv:1611.07715v1 [cs.CV], arxiv.org, Cornell University Library, 201 Olin Library Cornell University Ithaca, NY 14853, Nov. 23, 2016, 13 Pages, XP080734020, abstract, sections 3, 5.2, 6.
Zhu X., et al., "Towards High Performance Video Object Detection", 2018 IEEE/CVF Conference on Computer Vision and Pattern Recognition, IEEE, Jun. 18, 2018, pp. 7210-7218, XP033473640, abstract sections 3.2, 3.3.
International Search Report and Written Opinion—PCT/US2023/071230—ISA/EPO—Mar. 11, 2024.

* cited by examiner

SEGMENTATION MASK EXTRAPOLATION

FIELD

The present disclosure generally relates to processing video data. For example, aspects of the present disclosure are related to systems and techniques for generating a segmentation mask (also referred to as a segmentation map) for video frames.

BACKGROUND

Many devices and systems allow video data to be processed and output for consumption. Digital video data includes large amounts of data to meet the demands of consumers and video providers. For example, consumers of video data desire high quality video, including high fidelity, resolutions, frame rates, and the like. Digital video data may also be used as sensor data. As an example, digital video and images may be gathered, transformed, and analyzed to detect objects. One such transformation, or model, that may be generated includes a segmentation mask. In segmentation, pixels and objects are identified and labeled with a corresponding labels of particular objects (e.g., humans, cars, background, etc.) within an image or video. The labeling may be performed on a per pixel basis. A segmentation mask may be a representation of the labels of the image or view.

The segmentation mask may be useful for many applications and systems, including augmented reality (AR), virtual reality (VR), mixed reality (MR), robotic systems, manufacturing systems, quality assurance, automotive and aviation (e.g., manufacturing, autonomous driving or navigation, etc.), three-dimensional scene understanding, object grasping, object tracking, video analytics, security systems, among many others. For instance, the segmentation mask may be associated with an image and allows each pixel of the image to be labeled according to an object category to predict objects in the view. The segmentation mask can facilitate effective operation of various systems. In an illustrative example, an autonomous vehicle can identify shapes and locations of other vehicles based on the segmentation mask. As another illustrative example, a segmentation mask may be used to identify objects, such as people, in a foreground to better enable video conferencing software to superimpose the foreground objects on a synthetic background.

In some cases, generating high quality segmentation masks can be resource intensive. Increasing video resolutions and frame rates can add to this resource use. Techniques for reducing computational resource use for generating segmentation masks may be desired.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary presents certain concepts relating to one or more aspects relating to the mechanisms disclosed herein in a simplified form to precede the detailed description presented below Systems and techniques are described for herein for improved video processing, such as video encoding and/or decoding. For example, a system can attempt to generate a segmentation mask for a non-key frame based on a segmentation mask for a key frame using a relatively faster segmentation mask engine, such as by extrapolating the segmentation mask based on motion vectors. The system may be able to determine, via one or more checks, that the quality of the extrapolated segmentation mask may be reliable and then fall back to a relatively slower segmentation mask engine, such as a segmentation mask ML model.

In one illustrative example, an apparatus for processing video data is provided. The apparatus including: at least one memory; and at least one processor (e.g., configured in circuitry) coupled to the at least one memory. The at least one processor is configured to: receive a first image after a previous image; receive a first segmentation mask associated with the previous image; estimate a first set of forward motion vectors between the previous image and the first image; estimate a reliability of the first set of forward motion vectors; and extrapolate a second segmentation mask associated with the first image using the first set of forward motion vectors and first segmentation mask based on the estimated reliability of the first set of forward motion vectors.

In another example, a method of processing video data. The method may include receiving a first image after a previous image; receiving a first segmentation mask associated with the previous image; estimating a first set of forward motion vectors between the previous image and the first image; estimating a reliability of the first set of forward motion vectors; and extrapolating a second segmentation mask associated with the first image using the first set of forward motion vectors and first segmentation mask based on the estimated reliability of the first set of forward motion vectors.

As another example, a non-transitory computer-readable medium having stored thereon instructions that, when executed by at least one processor, cause the at least one processor to: receive a first image after a previous image; receive a first segmentation mask associated with the previous image; estimate a first set of forward motion vectors between the previous image and the first image; estimate a reliability of the first set of forward motion vectors; and extrapolate a second segmentation mask associated with the first image using the first set of forward motion vectors and first segmentation mask based on the estimated reliability of the first set of forward motion vectors.

In another example, an apparatus for processing video data is provided. The apparatus includes means for receiving a first image after a previous image; means for receiving a first segmentation mask associated with the previous image; means for estimating a first set of forward motion vectors between the previous image and the first image; means for estimating a reliability of the first set of forward motion vectors; and means for extrapolating a second segmentation mask associated with the first image using the first set of forward motion vectors and first segmentation mask based on the estimated reliability of the first set of forward motion vectors.

In some aspects, the apparatus comprises a mobile device (e.g., a mobile telephone or so-called "smart phone", a tablet computer, or other type of mobile device), a wearable device, an extended reality device (e.g., a virtual reality (VR) device, an augmented reality (AR) device, or a mixed reality (MR) device), a personal computer, a laptop computer, a video server, a television (e.g., a network-connected television), a vehicle (or a computing device of a vehicle), or other device. In some aspects, the apparatus includes at least one camera for capturing one or more images or video frames. For example, the apparatus can include a camera (e.g., an RGB camera) or multiple cameras for capturing one or more images and/or one or more videos including video frames. In some aspects, the apparatus includes a display for displaying one or more images, videos, notifications, or other displayable data. In some aspects, the apparatus includes a transmitter configured to transmit one or more video frame and/or syntax data over a transmission medium to at least one device. In some aspects, the processor includes a neural processing unit (NPU), a central processing unit (CPU), a graphics processing unit (GPU), or other processing device or component.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following figures.

DETAILED DESCRIPTION

Figure 1:
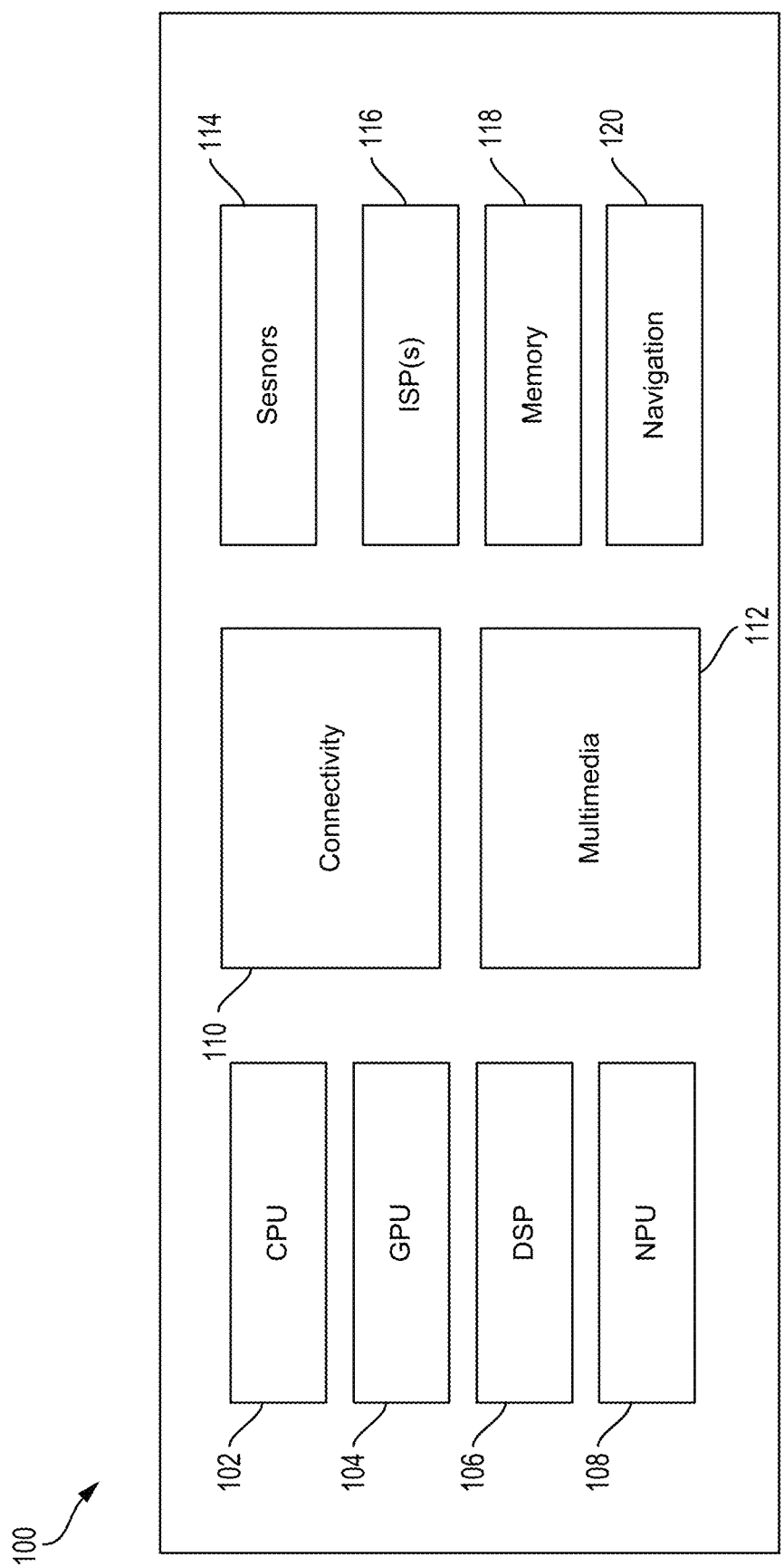
FIG. 1 illustrates an example implementation of a system-on-a-chip (SOC), in accordance with some examples.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the example embodiments will provide those skilled in the art with an enabling description for implementing an example embodiment. It should be understood that various changes may be made in the function and arrangement of elements without departing from the spirit and scope of the application as set forth in the appended claims.

In some cases, processing digital video data may include identifying objects present within the media prior to applying effects to the media. For example, adding a virtual background to a video conference may involve identifying objects (e.g., persons) in the foreground. In some cases, objects in an image may be identified by using one or more neural networks or other machine learning (ML) models to assign segmentation classes (e.g., person, class, car class, background class, etc.) to each pixel in a frame and then grouping contiguous pixels sharing a segmentation class to form an object of the segmentation class (e.g., a person, car, background, etc.). This technique may be referred to as pixel-wise semantic segmentation. The pixel-wise labels may be referred to as a segmentation mask (also referred to herein as a segmentation map).

In some cases, pixel-wise semantic segmentation may involve inputting an image into an ML model, such as a convolutional neural network (CNN). The ML model may then output a segmentation mask or map for the inputted image. The segmentation mask may include segmentation class information for each pixel in the frame. In some cases, the segmentation mask may be configured to keep information only for pixels corresponding to one or more classes (e.g., for pixels classified as a person), isolating the selected classified pixels from other classified pixels (e.g., isolating person pixels from background pixels).

Processing digital video data can be computationally intensive, particularly as the demand for high quality video data continues to grow. For example, as video conferencing becomes more mainstream, consumers may desire video of increasingly high quality, with high fidelity, resolution, frame rates, etc., along with increasingly higher quality effects, such as virtual backgrounds, animated effects, etc. However, the large amount of processing of the video data required to meet such demands can be difficult to perform in real time. For example, generating a segmentation mask in real-time with high resolution and high frame rate video data on numerous objects may be computationally intensive and/or power hungry.

To help reduce computational complexity, a simpler segmentation ML model that can be run for each image may be used. In some cases, the simpler segmentation ML model may be for each image in real time. However, using a simpler segmentation ML model can involve trade-offs with respect, for example, to the quality and consistency of segmentation masks generated by the simpler segmentation ML model. Alternatively, a more complex segmentation ML model that may not be able to be run in real time (e.g., for each image). In some cases, the segmentation ML model may be used for key frames along with optical flow for masked frames for non-key frames.

In some cases, using ML models to generate a segmentation mask (or map) for each frame in the video may be computationally intensive, especially as the frame rate (measured in frames per second (FPS)) of the video increases. To reduce the computational load, the fully convolutional neural network may be run for a subset of the video's frames (referred to as key frames) and motion vectors may be computed for the frames in between the key frames (referred to as intervening or non-key frames). For example, for a key frame, such as frame 1, an ML model may be used to generate a corresponding segmentation mask (e.g., segmentation map) for the key frame. For a non-key frame, such as frame 2 located between two consecutive key frames (e.g., frame 1 and frame 5), a motion estimate may be generated for objects in the non-key frame using the first key frame, the non-key frame (e.g., frame 2), and a segmentation mask from the first key frame. A segmentation mask for the non-key frame (e.g., frame 2) may be generated for the using the segmentation mask for a prior frame, such key frame 1, and the motion estimate. However, generating the segmentation mask using motion estimates may be challenging, for example, for video containing relatively large amounts of motion. In addition, the more temporally far a frame lies from a key frame, the less accurate the motion estimation and thus segmentation mask may be.

Systems, apparatuses, electronic devices, methods (also referred to as processes), and computer-readable media (collectively referred to herein as "systems and techniques") are described for extrapolating segmentation masks for images (e.g., images or frames of a video). For example, the systems and techniques may provide segmentation mask extrapolation with fallback for generating segmentation masks for images of a video. In performing the segmentation mask extrapolation with fallback, a segmentation mask ML model may be used to generate a segmentation mask (or segmentation map) for key frames of a video. For a current non-key frame, a set of forward motion vectors can be estimated based on previous image and a current image. The set of forward motion vectors may be evaluated for reliability based on certain reliability criteria or heuristics. In some cases, if the set of forward motion vectors are determined to be reliable, then a segmentation mask may be extrapolated using the segmentation mask of the previous image and the set of forward motion vectors. In some cases, if the set of forward motion vectors are determined not to be reliable, fallback to the segmentation mask ML model may be triggered. In the fallback case, the segmentation mask for the current image may be generated using the segmentation mask ML model.

Various aspects of the present disclosure will be described with respect to the figures. Aspects of the disclosure are initially described in the context of a multimedia system. Specific examples are then described of devices and media processing systems that segmentation mask extrapolation. Aspects of the disclosure are further illustrated by and described with reference to apparatus diagrams, system diagrams, and flowcharts that relate to segmentation mask extrapolation.

FIG. 1 illustrates an example implementation of a system-on-a-chip (SOC) 100, which may include a central processing unit (CPU) 102 or a multi-core CPU, configured to perform one or more of the functions described herein. Parameters or variables (e.g., neural signals and synaptic weights), system parameters associated with a computational device (e.g., neural network with weights), delays, frequency bin information, task information, among other information may be stored in a memory block associated with a neural processing unit (NPU) 108, in a memory block associated with a CPU 102, in a memory block associated with a graphics processing unit (GPU) 104, in a memory block associated with a digital signal processor (DSP) 106, in a memory block 118, and/or may be distributed across multiple blocks. Instructions executed at the CPU 102 may be loaded from a program memory associated with the CPU 102 or may be loaded from a memory block 118.

The SOC 100 may also include additional processing blocks tailored to specific functions, such as a GPU 104, a DSP 106, a connectivity block 110, which may include fifth generation (5G) connectivity, fourth generation long term evolution (4G LTE) connectivity, Wi-Fi connectivity, USB connectivity, Bluetooth connectivity, and the like, and a multimedia processor 112 that may, for example, detect and recognize gestures. In one implementation, the NPU is implemented in the CPU 102, DSP 106, and/or GPU 104. The SOC 100 may also include a sensor processor 114, image signal processors (ISPs) 116, and/or navigation module 120, which may include a global positioning system.

The SOC 100 may be based on an ARM instruction set. SOC 100 and/or components thereof may be configured to perform segmentation mask extrapolation. For example, the CPU 102, DSP 106, and/or GPU 104 may be configured to perform segmentation mask extrapolation by instructions included in a software application stored at least in part on memory 118.

Figure 2:
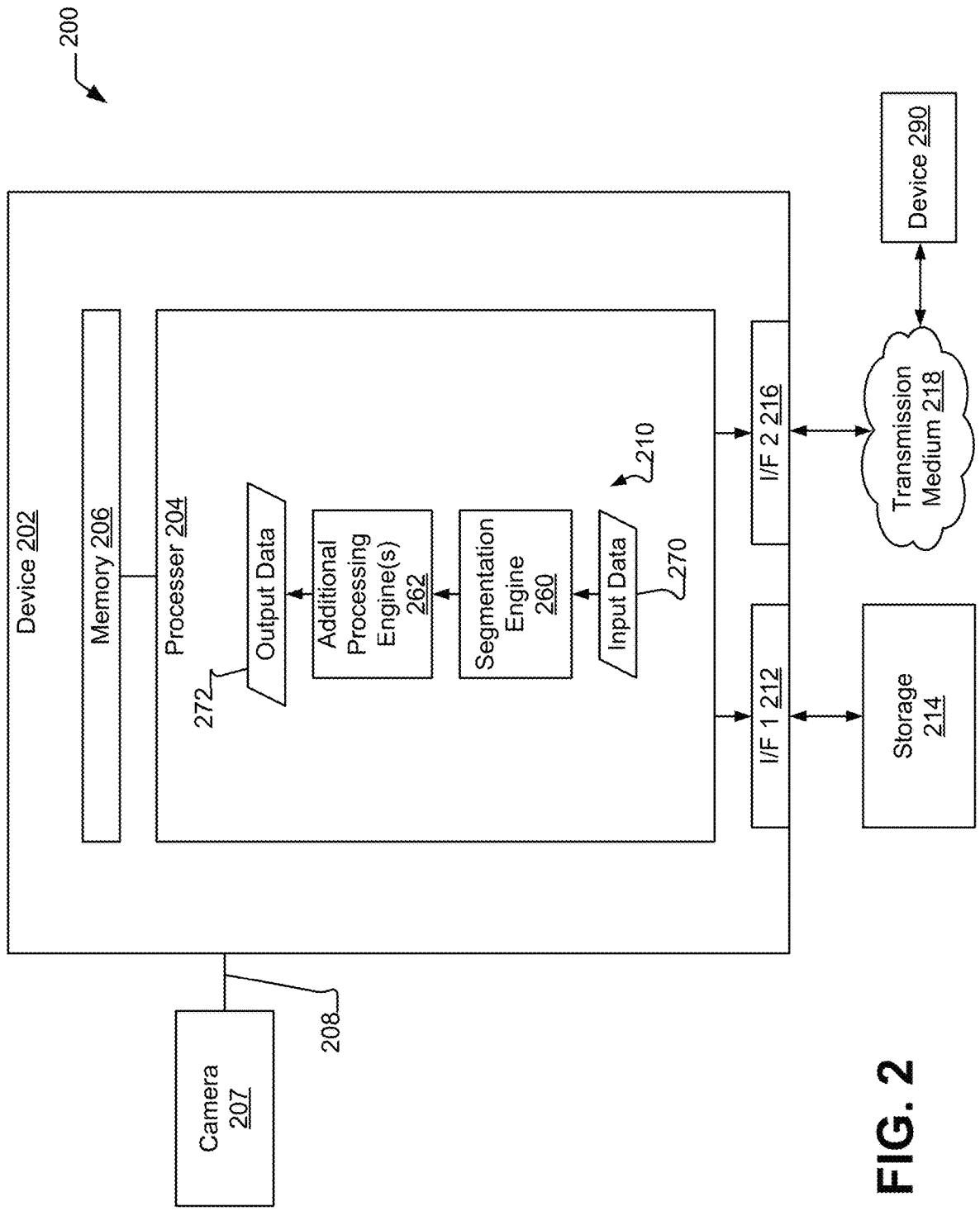
FIG. 2 is a diagram illustrating a system that includes a device configured to perform segmentation mask extrapolation with fallback as a part of a video processing pipeline, in accordance with aspects of the present disclosure.

FIG. 2 depicts a system 200 that includes a device 202 configured to perform segmentation mask extrapolation with fallback as a part of a video processing pipeline 210. The device 202 is coupled to a camera 207 and a storage medium 214 (e.g., a data storage device). In some implementations, the camera 207 is configured to provide the image data 208 (e.g., a video data stream) to the processor 204 for processing by the video processing pipeline 210. The processor 204 may be a CPU, DSP, GPU, or other processor capable of processing video data. In some implementations, the device 202 can be coupled to and/or can include multiple cameras (e.g., a dual-camera system, three cameras, or other number of cameras). In some cases, the device 202 can be coupled to a microphone and/or other input device (e.g., a keyboard, a mouse, a touch input device such as a touchscreen and/or touchpad, and/or other input device). In some examples, the camera 207, the storage medium 214, microphone, and/or other input device can be part of the device 202.

The device 202 is also coupled to a second device 290 via a transmission medium 218, such as one or more wireless networks, one or more wired networks, or a combination thereof. For example, the transmission medium 218 can include a channel provided by a wireless network, a wired network, or a combination of a wired and wireless network. The transmission medium 218 may form part of a packet-based network, such as a local area network, a wide-area network, or a global network such as the Internet. The transmission medium 218 may include routers, switches, base stations, or any other equipment that may be useful to facilitate communication from the source device to the receiving device. A wireless network may include any wireless interface or combination of wireless interfaces and may include any suitable wireless network (e.g., the Internet or other wide area network, a packet-based network, WiFi™, radio frequency (RF), UWB, WiFi-Direct, cellular, Long-Term Evolution (LTE), WiMax™, or the like). A wired network may include any wired interface (e.g., fiber, ethernet, powerline ethernet, ethernet over coaxial cable, digital signal line (DSL), or the like). The wired and/or wireless networks may be implemented using various equipment, such as base stations, routers, access points, bridges, gateways, switches, or the like. The encoded video bitstream data may be modulated according to a communication standard, such as a wireless communication protocol, and transmitted to the receiving device. In some cases, the device 290 may be substantially similar to device 202.

The device 202 includes one or more processors (referred to herein as "processor") 204 coupled to a memory 206, a first interface ("I/F 1") 212, and a second interface ("I/F 2") 216. The processor 204 is configured to receive image data 208 from the camera 207, from the memory 206, and/or from the storage medium 214. The processor 204 is coupled to the storage medium 214 via the first interface 212 (e.g., via a memory bus) and is coupled to the transmission medium 218 via the second interface 216 (e.g., a network interface device, a wireless transceiver and antenna, one or more other network interface devices, or a combination thereof).

The processor 204 includes the video processing pipeline 210. Input data 270 may be input to the video processing pipeline 210. The input data 270 may be one or more images of a video. In some cases, the input data 270 may be obtained by camera 207. The video processing pipeline 210 includes a segmentation engine 260. The segmentation engine 260 is configured to receive input data 270 and to process the input data 270 to generate segmentation data, such as a segmentation mask based on the input data 270. The segmentation data may be output from the segmentation engine 260 to one or more additional processing engines 262 for further processing. After processing by the one or more additional processing engines 262, output data 272 may be generated. In some cases, the output data 272 may be stored, for example, in storage medium 214 via I/F 1 212. The output data 272 may, in some examples, be transmitted to device 290 via the transmission medium 218 and I/F 2 216.

As indicated above, some implementations of processor 204 include multiple processors and elements of the video processing pipeline 210 may be included on (e.g., performed by) different processors of the multiple processors. For example, the segmentation engine 260 may be included on a custom processor, such as an application specific integrated circuit (ASIC).

Figure 3:
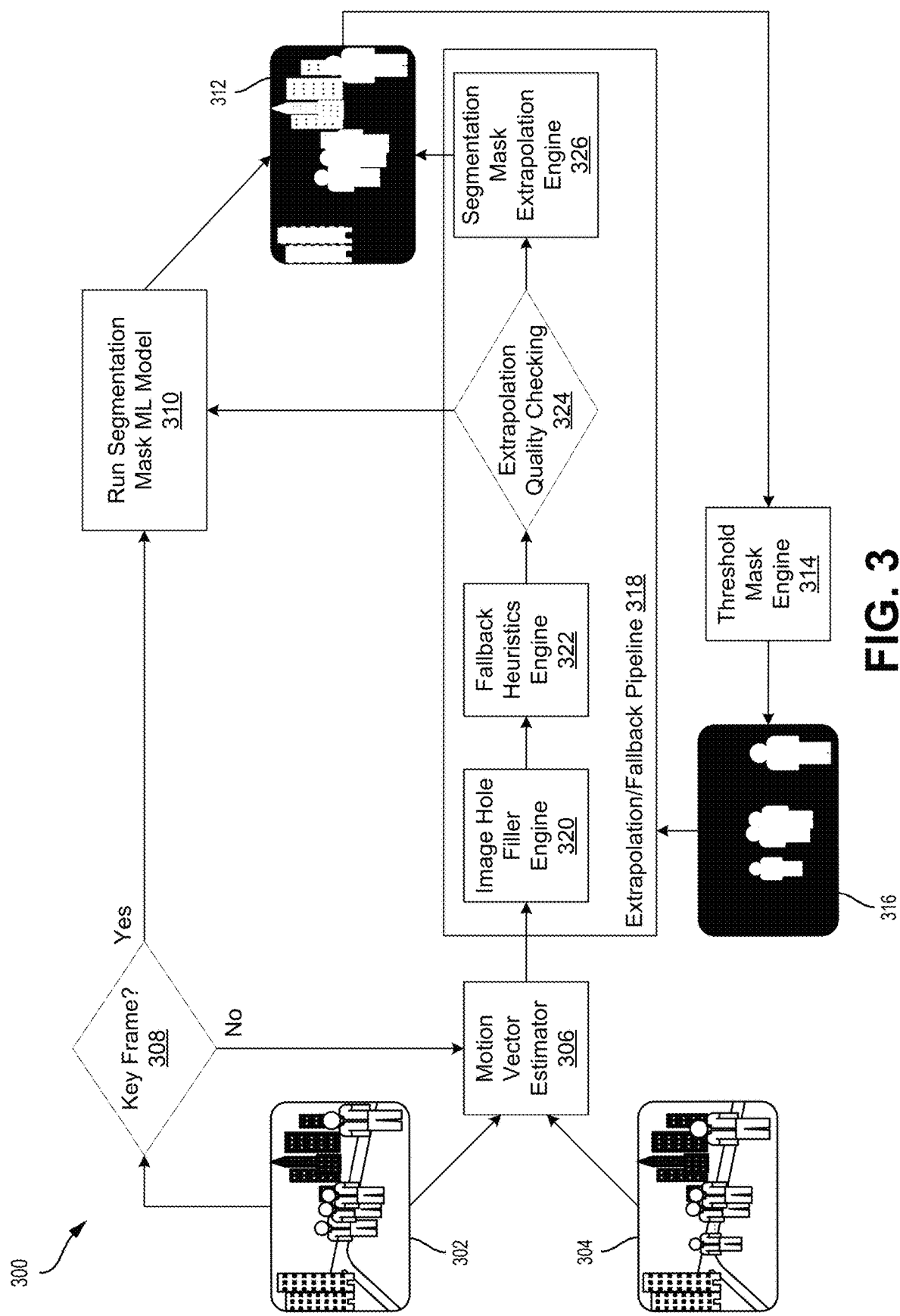
FIG. 3 is a diagram 300 illustrating an overview of a technique for segmentation mask extrapolation with fallback, in accordance with aspects of the present disclosure.

FIG. 3 is a diagram 300 illustrating an overview of a technique for segmentation mask extrapolation with fallback, in accordance with aspects of the present disclosure. In diagram 300, a current image 302 captured at time t along with a previous image 304 captured at time t−1 may be input to a motion vector estimator 306. The current image 302 is checked at step 308 to see if the current image 302 is a key frame.

If the current image 302 is a key frame, the current image 302 may be passed to a segmentation mask ML model 310. In some cases, the segmentation mask ML model 310 may be a relatively high-quality segmentation mask ML model. In some cases, the relatively high-quality segmentation mask ML model may not be capable of being executed in real-time on the system or device the ML model is being executed on. In some cases, the relatively high-quality segmentation mask ML model may be capable of executing in real-time, but may consume a relatively large amount of power, for example, as compared to segmentation mask extrapolation. The segmentation mask ML model 310 may generate a segmentation mask 312 for the current image 302 for output. As shown, the segmentation mask 312 may label and group pixels (such as for people and buildings in the current image 302) according to categories for the current image 302. It should be understood that the segmentation mask 312 is shown for clarity and data represented by the segmentation mask 312 may be, for example, associated with (e.g., appended to, added to, etc.) to the input image as metadata.

In some cases, the segmentation mask 312 may be input to a threshold mask engine 314. The threshold mask engine 314 may apply a threshold mask on the segmentation mask 312 to mark portions of the segmentation mask 312 as part of the foreground or background. In some cases, the threshold mask engine 314 may mark individual pixels. In some cases, the threshold mask engine 314 may mask out pixels of non-interesting objects so the non-interesting objects may be merged as part of the background. For example, a threshold mask engine 314 of a video conferencing application may mask out (e.g., merged into the background) chairs, windows, etc. in the background. In other cases, the threshold mask engine 314 may mark portions of the threshold mask in blocks. For example, the threshold mask engine may mark 8×8 pixel blocks as members of foreground or background. Block-based masking may be used, for example, where the motion vector estimator engine 306 generates block based optical flow information between the current image 302 and previous image 304.

In diagram 300, a representation of the threshold segmentation mask 316 illustrates objects marked as foreground objects and omits objects marked as background objects. It should be understood that the representation of threshold segmentation mask 316 is shown for clarity and that the data of the representation of threshold segmentation mask 316 may include indications for both background and foreground objects. The threshold segmentation mask may be input to the extrapolation/fallback pipeline 318.

If, at step 308, the current image 302 is determined as not a key frame, an indication may be passed to the motion vector estimator engine 306. The motion vector estimator engine 306 may estimate motion vectors for the current image 302. The motion vectors describe differences (e.g., an optical flow) between one image and another image. In some cases, the motion vector estimator engine 306 may generate motion vectors as between consecutive frames, such as the current image 302 and the previous image 304. In some cases, the motion vector estimator engine 306 may generate motion vectors in a forward direction (e.g., forward in time such as from time t−1 to time t). In some cases, backward motion vectors may also be generated, for example, to check a reliability of the forward motion vectors. In some cases, the motion vectors may be generated in a manner similar to motion estimation for video encoding/decoding. The motion vectors may be generated on a per pixel or block level.

The generated motion vectors and current image 302 may be passed to an image hole filler engine 320 of the extrapolation/fallback pipeline 318. When an object moves, areas behind the object may become visible. If these uncovered areas were not visible in the previous image, then there may not be any motion vectors in the vector field (e.g., holes in the vector field) to describe the uncovered areas. The image hole filler engine 320 detects and fills these holes in the vector field. The filled motion vectors and current image 302 may then be input to a fallback heuristics engine 322. Operations performed by the image hole filler engine 320 are discussed in more detail below.

The fallback heuristics engine 322 can measure a set of heuristics based on, for example, the motion vectors from the current image 302 to determine whether an extrapolated segmentation mask is expected to be inaccurate. If the extrapolated segmentation mask is expected to be inaccurate, the extrapolation/fallback pipeline 318 may decline to extrapolate the segmentation mask and instead run the segmentation mask ML model 310 on the current image 302. If the extrapolated segmentation mask is not expected to be inaccurate, the extrapolation/fallback pipeline 318 may proceed to extrapolate the segmentation mask using the extrapolation engine 326.

In some cases, the extrapolated segmentation mask may be inaccurate if there is too much foreground motion. To help detect this foreground motion, the fallback heuristics engine 322 may determine one or more statistics based on the set of motion vectors and apply certain heuristic checks. As a first example heuristic check, the fallback heuristics engine 322 may determine gradients for the foreground motion vectors using the threshold segmentation mask 316 from the previous image 304 and the filled motion vectors for the current image 302. At step 324, the determined gradients may be compared to a gradient threshold value. If the gradients are above the gradient threshold value, then fallback to the segmentation mask ML model 310 may be triggered at step 324. The extrapolation/fallback pipeline 318 may pass the current image to the segmentation mask ML model 310 and the segmentation mask ML model 310 may be run on the current image 302.

As a second example heuristic check, the fallback heuristics engine 322 may determine whether to fallback to the segmentation mask ML model 310 based on a percent change of foreground objects and their corresponding motion vectors. For example, based on the threshold segmentation mask 316 from the previous image 304 and the filled motion vectors for the current image 302, the fallback heuristics engine 322 may determine if more than a threshold percentage (e.g., value) of the foreground pixels have moved. If more than a threshold percentage if the threshold percentage of the foreground pixels have moved, then fallback to the segmentation mask ML model 310 may be triggered at step 324. The extrapolation/fallback pipeline 318 may pass the current image to the segmentation mask ML model 310 and the segmentation mask ML model 310 may be run on the current image 302

As a third example heuristic check, the fallback heuristics engine 322 may determine a reliability of the foreground motion vectors. The fallback heuristics engine 322 may determine the reliability of the foreground motion vectors in a variety of ways, such as by comparing forward and backward motion vectors to see how well the forward and backward motion vectors agree (e.g., amount of difference between the forward and negative of the backward motion vectors), how spatially correlated motion vectors are for objects, input and output spatial image distributions, or any other suitable reliability measurement. If the fallback heuristics engine 322 determines that reliability is low, then fallback to the segmentation mask ML model 310 may be triggered at step 324. The extrapolation/fallback pipeline 318 may pass the current image to the segmentation mask ML model 310 and the segmentation mask ML model 310 may be run on the current image 302.

If, at step 324, the set of heuristics indicate that the extrapolated segmentation mask is not expected to be inaccurate, the previous mask 316 and the filled motion vectors for the current image 302 may be passed from the fallback heuristics engine 322 to the segmentation mask extrapolation engine 326. The threshold segmentation mask 316 from the previous image 304 may also be input to the segmentation mask extrapolation engine 326. The segmentation mask extrapolation engine 326 may interpolate from the threshold segmentation mask 316 from the previous image 304 based on the filled motion vectors for the current image 302 to generate a segmentation mask 312 for the current image 302.

Generating the segmentation mask 312 by extrapolating from a previous segmentation mask when conditions are favorable allows for more accurate and higher quality segmentation masks to be generated by extrapolation. Similarly, falling back to the segmentation mask ML model 310 when conditions are unfavorable for extrapolating from a previous segmentation mask allows the segmentation mask ML model 310 to be used as appropriate by balancing power and resources savings of using extrapolation instead of the segmentation mask ML model 310, while allowing for increased accuracy as compared to using extrapolation alone.

Figure 4:
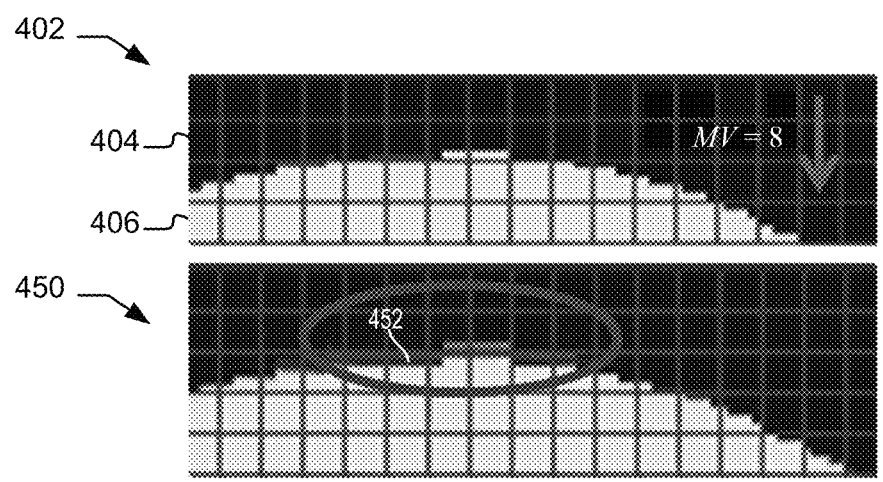
FIG. 4 illustrates segmentation mask holes, in accordance with aspects of the present disclosure.

FIG. 4 illustrates segmentation mask holes, in accordance with aspects of the present disclosure. In some cases, each pixel of a segmentation mask, such as segmentation mask 402, may be labeled. In some cases, the pixels may be grouped into blocks and foreground/background labeling may be performed on a block-by-block basis rather than per pixel. Segmentation mask 402 shows two labels for pixels of the segmentation mask, a background object 404 and a foreground object 406. The segmentation mask 402 may be associated with motion vectors of 8 pixels downward for pixels associated with the foreground object 406. In segmentation mask 450, the motion vectors were applied and the pixels of the foreground object 406 moved 8 pixels downward.

In some cases, it may be assumed that when a foreground object moves, parts of the background become uncovered. In this example, the movement of the pixels of the foreground object 406 uncover a portion 452 (e.g., a hole) of the background object 404 that was not visible in segmentation mask 402. As the portion was not visible in segmentation mask 402, there may not be image information nor motion vectors associated with pixels of the portion 452. In some cases, a hole filling process may be used to generate image information and motion vectors for pixels of the portion 452 based on neighboring pixels of the background.

Figure 5:
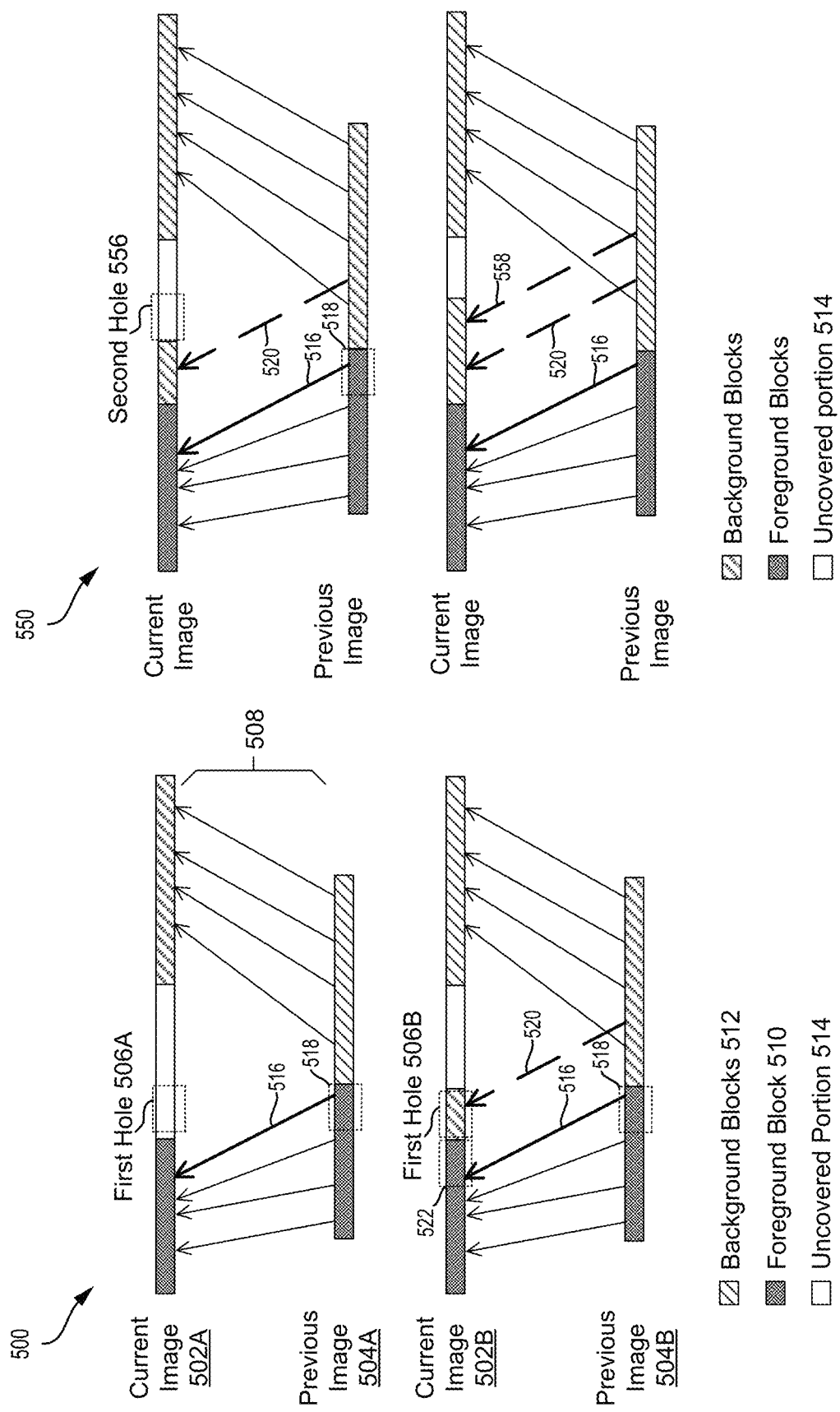
FIG. 5A is a diagram illustrating a first hole filling process, in accordance with aspects of the present disclosure.
FIG. 5B is a diagram illustrating filling the second hole of the uncovered portion, in accordance with aspects of the present disclosure.

FIG. 5A is a diagram 500 illustrating a first hole filling process, in accordance with aspects of the present disclosure. Diagram 500 includes lines of blocks of an image for a current image 502A and a previous image 504A prior to filling a first hole 506A as well as lines of pixels of the current image 502B and the previous image 504B after filling the first hole 506B. A set of motion vectors 508 illustrate where blocks of the previous image 504A have moved to in the current image 502A.

In diagram 500, foreground blocks 510 are associated with (e.g., labeled as) a foreground object and background blocks 512 are associated with (e.g., labeled as) a background object. In the previous image 504A, the foreground blocks 510 are adjacent to the background blocks 512. As described by motion vectors 508, the foreground blocks 510 have moved leftward in the current image 502A as compared to the previous image 504A, while the background blocks 512 have moved rightward, leaving an uncovered portion 514 (e.g., hole). In this example, the uncovered portion 514 is three blocks in size and the first hole 506A corresponds with a first block of the uncovered portion 514.

In some cases, uncovered portions may be detected based on blocks in the current image 502A not associated with one or more motion vectors from a previous image. After uncovered portions are found, the uncovered portions may be filled. In some cases, it can be assumed that when a foreground object, such as a foreground object associated with foreground blocks 510, portions of the background, such as a background associated with background blocks 512, are likely to be uncovered.

With an assumption that the foreground covers the background, uncovered blocks, such as uncovered portion 514, may be filled using a neighboring background block of motion vectors and corresponding pixel information. In some cases, filling an uncovered block with a background block may be performed by searching for a nearest (e.g., closest) foreground block and copying the foreground block's motion vector to the uncovered block. For example, for the first hole 506B of the uncovered portion 514, a search may indicate that a nearest foreground block 510 is block 518 in the current image 502B. The motion vector 516 corresponding to block 522 describing the motion from block 518 of the previous image 504B to the current image 502B may be copied as motion vector 520 and the copied motion vector 520 is assigned to the first hole 506B.

FIG. 5B is a diagram 550 illustrating filling the second hole 556 of the uncovered portion 514, in accordance with aspects of the present disclosure. In some cases, a motion vector for a nearest foreground block may be used multiple times. For example, foreground block 518 may be the nearest foreground block to a second hole 556 of an uncovered portion 514. In such a case, the motion vector 516 associated with the nearest foreground block 518 is copied as motion vector 558 and the copied motion vector 558 is assigned to the second hole 556.

Figure 6:
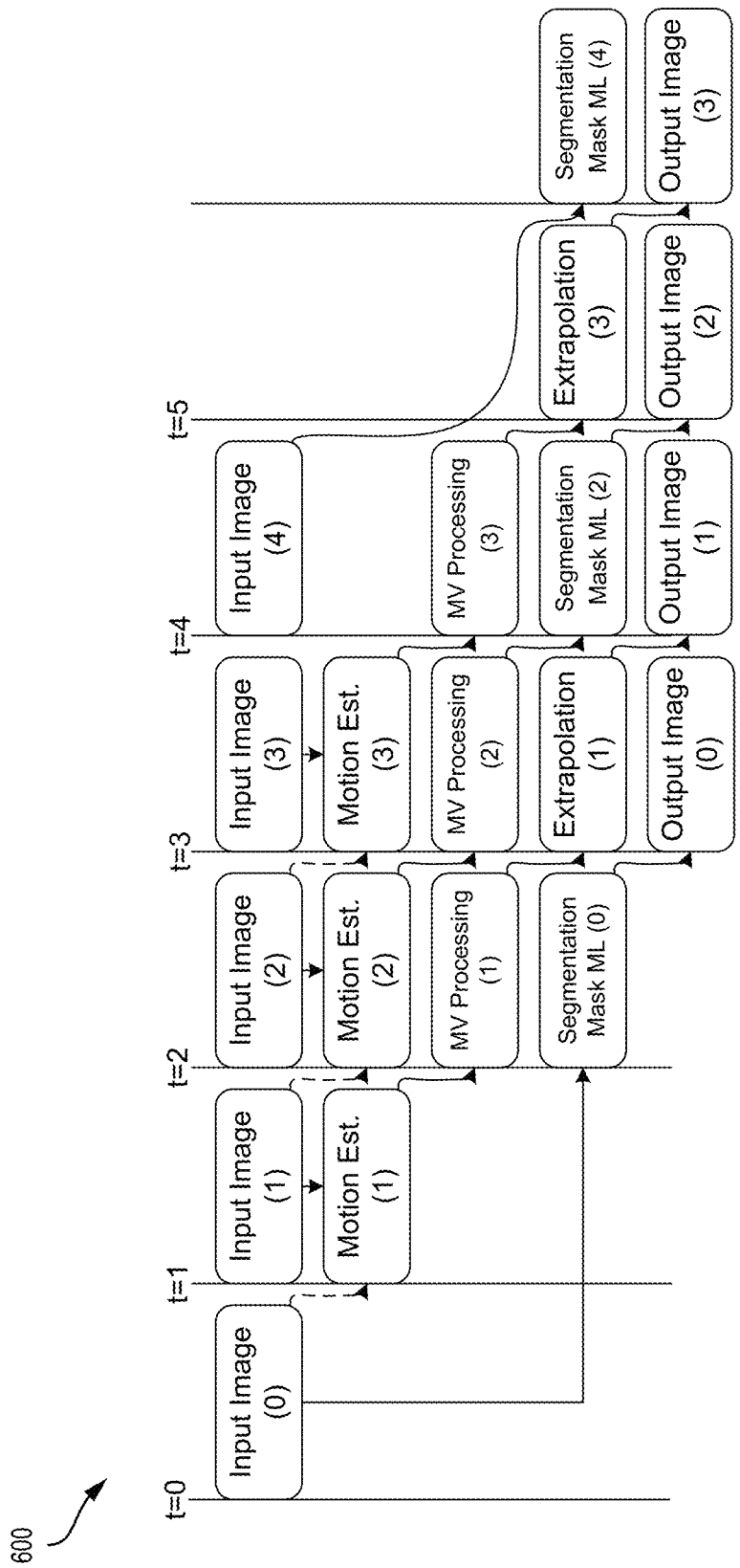
FIG. 6 is a diagram illustrating dataflows of a technique for segmentation mask extrapolation with fallback, in accordance with aspects of the present disclosure.

FIG. 6 is a diagram 600 illustrating dataflows of a technique for segmentation mask extrapolation, in accordance with aspects of the present disclosure. In diagram 600, input image (0) may be a keyframe for an input video input at t=0. Input image (0) may be passed directly to a segmentation mask ML model (0) step at t=2 to generate an output image (0) at t=3 with a corresponding segmentation mask. In this example, the segmentation mask ML model may be capable of generating a segmentation mask in real time (e.g., within a time frame less than or the same as a frame rate of a video being processed).

A next input image may be received at t=1 at an input image (1) step and the next input image may not be a key frame. Thus, the next input image may be passed to a motion est. (1) step, which may be performed by a motion vector estimation engine such as motion vector estimator engine 306. The input image from step input image (0) may also be used for motion vector estimation in the motion est. (1) step. Output of the motion est. (1) step may be passed to a MV processing (1) step, which may be performed by extrapolation/fallback pipeline 318, for motion vector processing.

Motion vector processing may include uncovered portion filling and heuristics determination and evaluation, such as that performed by the image hole filler engine 320, fallback heuristics engine 322, and extrapolation quality checking step 324 of FIG. 3. Based on a determination that the motion vectors may be reliable at the MV processing (1) step, an extrapolation (1) step, for example performed by segmentation mask extrapolation engine 326, extrapolates segmentation masks based on the estimated motion vectors at t=3 and outputs an image and corresponding segmentation mask at an output image (1) step at t=4.

Another input image may be received at t=2 at an input image (2) step. At a motion est. (2) step, motion vectors may be estimated at a motion est. (2) step between the other image and the next input image received at input image step (1). Output of the motion est. (2) step may be passed to a MV processing (2) step. In this example, the MV processing (2) step may determine that the motion vectors may not be reliable. Based on the determination that the motion vectors may not be reliable, the other input image received at the input image (2) step may be passed, at a segmentation mask ML (2) step, to the segmentation mask ML model for processing. A segmentation mask and corresponding image may be output at step output image (2) at t=5.

In diagram 600, an image input at t=3 at step input image (3) may have a segmentation mask generated via extrapolation in a manner similar to the image input at t=1. An image input at t=4 at step input image (4) may be a key frame and may be processed by the segmentation mask ML model at a segmentation mask ML (4) step.

As shown in diagram 600, where the segmentation mask ML model may be run in real time, use of segmentation mask ML model may be reduced by extrapolating the segmentation mask and falling back to the segmentation mask ML model as needed. This can help trade off usage of a relatively resource intensive ML model processing for relatively less resource intensive motion vector generation/processing and segmentation mask extrapolation.

Figure 7:
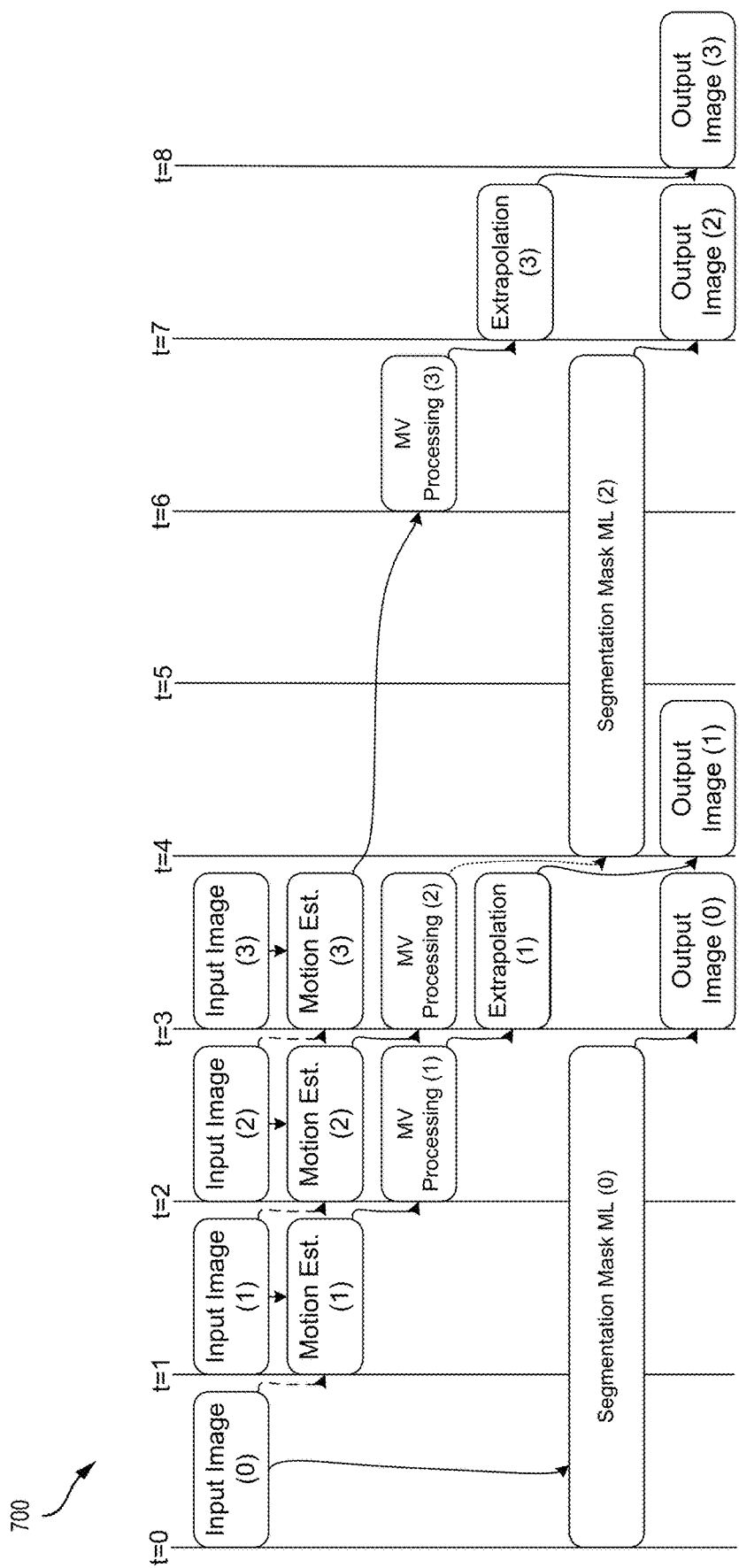
FIG. 7 is a diagram illustrating alternate dataflows of a technique for segmentation mask extrapolation with fallback, in accordance with aspects of the present disclosure.

In some cases, dataflows for where the segmentation mask ML model cannot be executed in real time (e.g., cannot execute within a time shorter than a frame rate of a video being processed). FIG. 7 is a diagram 700 illustrating dataflows of a technique for segmentation mask extrapolation with fallback, in accordance with aspects of the present disclosure. Dataflows illustrated in diagram 700 are similar to dataflows shown in diagram 600. The primary difference is due to execution times for the segmentation mask ML model can span multiple time periods N. In diagram 700, execution time for the segmentation mask ML model may span 3 time periods (e.g., N=3). For example, a key frame image input at an input image (0) step may be passed to the segmentation mask ML (0) step at t=1. The segmentation mask ML step (0) may completed after t=3 and output an segmentation mask and image at the output image (0) step at t=4.

A second input image that is not a key frame may be received at t=1 at an input image (1) step. The second input image may be passed to a motion est. (1) step. The input image from step input image (0) may also be used for motion vector estimation and may also be used in the motion est. (1) step. Output of the motion est. (1) step may be passed to a MV processing (1) step. Based on a determination that the motion vectors may be reliable at the MV processing (1) step, an extrapolation (1) step may be performed at t=4 to extrapolate a segmentation mask for the second input image at t=5.

A third input image that is not a key frame may be received at t=2 at an input image (2) step. The third input image may be passed to a motion est. (2) step. The input image from step input image (1) may also be used for motion vector estimation and may also be used in the motion est. (2) step. Output of the motion est. (2) step may be passed to a MV processing (2) step. Based on a determination that the motion vectors estimated in the motion est. (2) step are not reliable, the third input image may be passed to the segmentation mask ML model at a segmentation mask ML (2) step. A segmentation mask and corresponding image may be output at step output image (2) at t=6.

A fourth input image that is also not a key frame may be receive at t=3 at an input image (3) step. Motion estimation may be performed on the fourth input image at a motion est. (3) step. In some cases, as execution time for the segmentation mask ML model can span multiple time periods, a time delay may be inserted to help sequence the output images. In diagram 700 output from the motion est. (3) step may be ready by t=4, but not acted on by the MV processing (3) step until t=6. Motion vector processing and extrapolation may be performed in a manner consistent with that discussed above with respect to the second input image and the MV processing (1) step and extrapolation (1) step. In some cases, fallback cannot be triggered at a rate higher than 1/N, or in one image out of three images in the above example. As shown in diagram 700, triggering fallback at a rate higher than 1/N may result in delayed output images. In some cases, wait times may be added to account for an amount of time used by the segmentation mask ML model.

In some cases, multiple segmentation ML models may be used in conjunction with the segmentation mask extrapolation with fallback techniques. For example, a relatively more complex, more accurate segmentation mask ML model may be used for key frames. This relatively more complex segmentation mask ML model may not be able to run at the frame rate of the input video. For non-key frames, a relatively simpler, less accurate, segmentation mask ML model that can run at the frame rate of the input video may be used for fallback from segmentation mask extrapolation.

Figure 8:
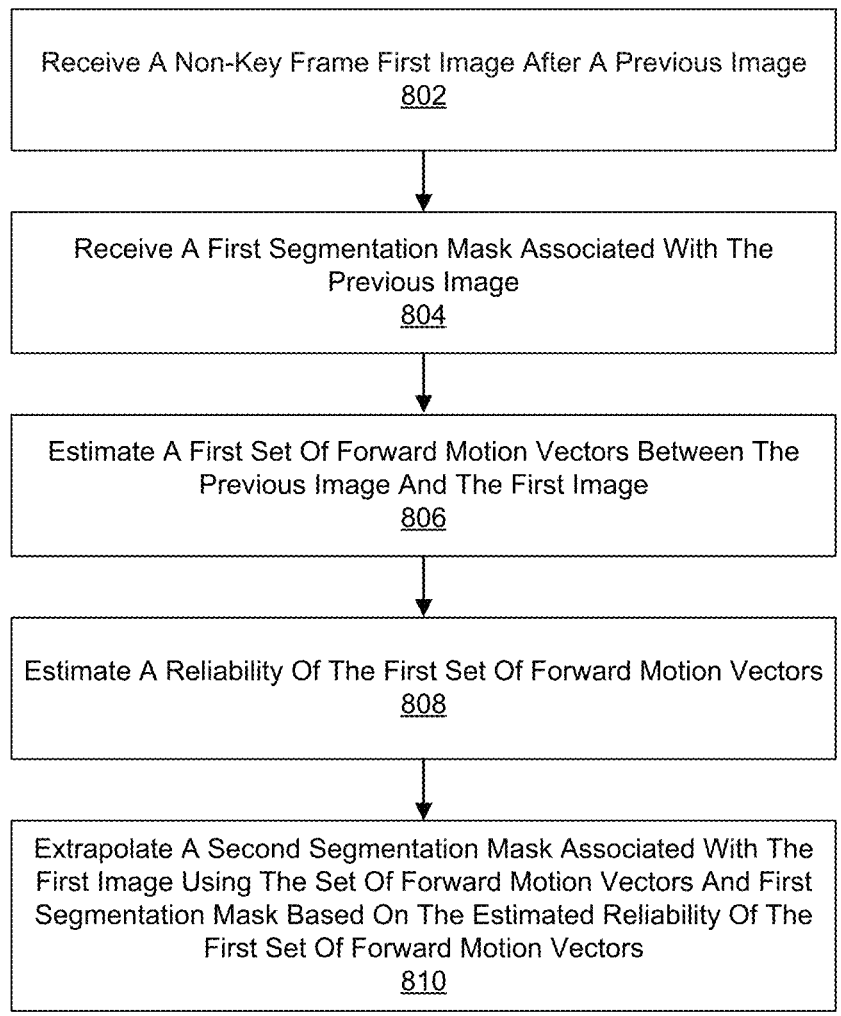
FIG. 8 is a flow diagram illustrating a technique for segmentation mask extrapolation with fallback, in accordance with aspects of the present disclosure.

FIG. 8 is a flow diagram illustrating a process 800 for processing video data (e.g., to generate one or more segmentation masks), in accordance with aspects of the present disclosure. The process 800 may be performed by a computing device (or apparatus) or a component (e.g., a chipset, codec, etc.) of the computing device. The computing device may be a mobile device (e.g., a mobile phone), a network-connected wearable such as a watch, an extended reality (XR) device such as a virtual reality (VR) device or augmented reality (AR) device, a vehicle or component or system of a vehicle, or other type of computing device. In some cases, the computing device may be or may include coding device, such as the encoding device 104, the decoding device 112, or a combined encoding device (or codec). The operations of the process 800 may be implemented as software components that are executed and run on one or more processors.

At block 802, the computing device (or component thereof) may receive a first image after a previous image. At block 804, the computing device (or component thereof) may receive a first segmentation mask associated with the previous image. In some cases, the first image is a non-key frame, and a segmentation mask machine learning model is configured to generate segmentation masks for key frames. At block 806, the computing device (or component thereof) may estimate a first set of forward motion vectors between the previous image and the first image. In some cases, the computing device (or component thereof) may label one or more portions of the first segmentation mask as part of a foreground or background. In some cases, the computing device (or component thereof) may detect an uncovered portion of the first image based on the first set of forward motion vectors; and fill the uncovered portion based on a neighboring background portion of the first segmentation mask and the previous image. In some cases, filling the uncovered portion may include identifying a motion vector associated with a foreground portion of the first segmentation mask closest to a portion of the uncovered portion, copying the motion vector, and associating the copied motion vector with the portion of the uncovered portion.

At block 808, the computing device (or component thereof) may estimate a reliability of the first set of forward motion vectors. In some cases, estimating the reliability of the first set of forward motion vectors comprises: determining one or more heuristic statistics based on the first set of forward motion vectors; and evaluating the one or more heuristic statistics to estimate the reliability of the first set of forward motion vectors. In some cases, the one or more heuristic statistics comprise at least one of: gradients for one or more motion vectors of the first set of forward motion vectors, or a percent change of a foreground. In some cases, evaluating the one or more heuristic statistics comprise at least one of: evaluating the gradients for one or more motion vectors against a gradient threshold value, or estimating the percent change of a foreground based on a threshold value of foreground motion vectors.

At block 810, the computing device (or component thereof) may extrapolate a second segmentation mask associated with the first image using the first set of forward motion vectors and first segmentation mask based on the estimated reliability of the first set of forward motion vectors. In some cases, the computing device (or component thereof) may receive a second image, wherein the second image is a non-key frame, wherein a segmentation mask machine learning model is configured to generate segmentation masks for key frames; estimate a second set of forward motion vectors between the second image and another previous image; estimate the reliability of the second set of forward motion vectors; and determine to apply a segmentation mask machine learning model to the second image based on an estimate that the second set of forward motion vectors is not reliable. In some cases, the computing device (or component thereof) may receive a third image, wherein the third image is a key frame, wherein a segmentation mask machine learning model is configured to generate segmentation masks for key frames; and apply a segmentation mask machine learning model to the third image.

In some examples, the techniques or processes described herein may be performed by a computing device or an apparatus, such as the encoding device 104, the decoding device 112, and/or any other computing device. In some cases, the computing device or apparatus may include a processor, microprocessor, microcomputer, or other component of a device that is configured to carry out the steps of processes described herein. In some examples, the computing device or apparatus may include a camera configured to capture video data (e.g., a video sequence) including video frames. For example, the computing device may include a camera device, which may or may not include a video codec. As another example, the computing device may include a mobile device with a camera (e.g., a camera device such as a digital camera, an IP camera or the like, a mobile phone or tablet including a camera, or other type of device with a camera). In some cases, the computing device may include a display for displaying images. In some examples, a camera or other capture device that captures the video data is separate from the computing device, in which case the computing device receives the captured video data. The computing device may further include a network interface, transceiver, and/or transmitter configured to communicate the video data. The network interface, transceiver, and/or transmitter may be configured to communicate Internet Protocol (IP) based data or other network data.

The processes described herein can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 9:
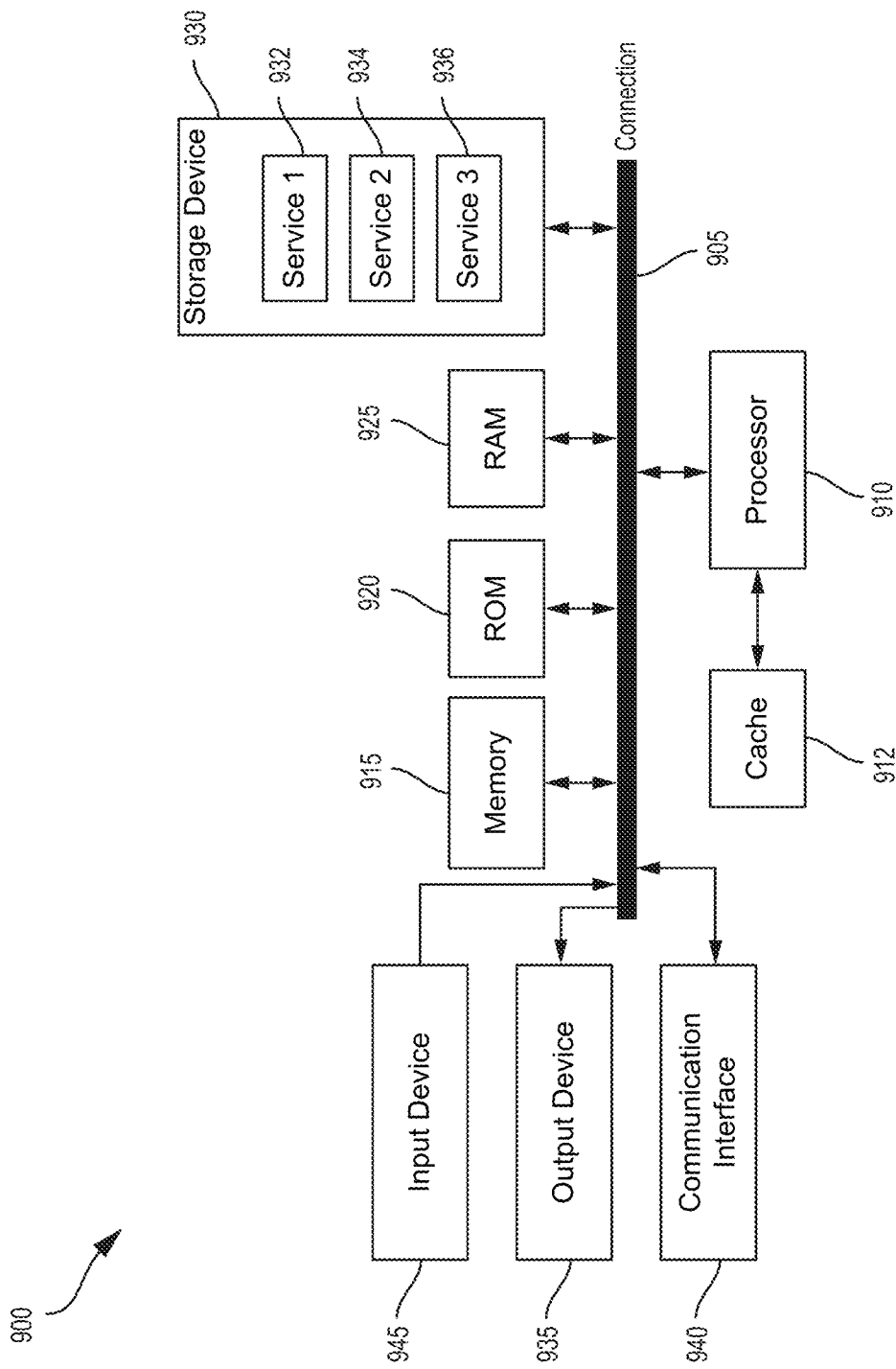
FIG. 9 illustrates an example computing device architecture of an example computing device which can implement the various techniques described herein.

FIG. 9 illustrates an example computing device architecture 900 of an example computing device which can implement the various techniques described herein. In some examples, the computing device can include a mobile device, a wearable device, an extended reality device (e.g., a virtual reality (VR) device, an augmented reality (AR) device, or a mixed reality (MR) device), a personal computer, a laptop computer, a video server, a vehicle (or computing device of a vehicle), or other device. For example, the computing device architecture 900 can be used as part of the system 200 of FIG. 2. The components of computing device architecture 900 are shown in electrical communication with each other using connection 905, such as a bus. The example computing device architecture 900 includes a processing unit (CPU or processor) 910 and computing device connection 905 that couples various computing device components including computing device memory 915, such as read only memory (ROM) 920 and random access memory (RAM) 925, to processor 910.

Computing device architecture 900 can include a cache of high-speed memory connected directly with, in close proximity to, or integrated as part of processor 910. Computing device architecture 900 can copy data from memory 915 and/or the storage device 930 to cache 912 for quick access by processor 910. In this way, the cache can provide a performance boost that avoids processor 910 delays while waiting for data. These and other modules can control or be configured to control processor 910 to perform various actions. Other computing device memory 915 may be available for use as well. Memory 915 can include multiple different types of memory with different performance characteristics. Processor 910 can include any general purpose processor and a hardware or software service, such as service 1 932, service 2 934, and service 3 936 stored in storage device 930, configured to control processor 910 as well as a special-purpose processor where software instructions are incorporated into the processor design. Processor 910 may be a self-contained system, containing multiple cores or processors, a bus, memory controller, cache, etc. A multi-core processor may be symmetric or asymmetric.

To enable user interaction with the computing device architecture 900, input device 945 can represent any number of input mechanisms, such as a microphone for speech, a touch-sensitive screen for gesture or graphical input, keyboard, mouse, motion input, speech and so forth. Output device 935 can also be one or more of a number of output mechanisms known to those of skill in the art, such as a display, projector, television, speaker device, etc. In some instances, multimodal computing devices can enable a user to provide multiple types of input to communicate with computing device architecture 900. Communication interface 940 can generally govern and manage the user input and computing device output. There is no restriction on operating on any particular hardware arrangement and therefore the basic features here may easily be substituted for improved hardware or firmware arrangements as they are developed.

Storage device 930 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 925, read only memory (ROM) 920, and hybrids thereof. Storage device 930 can include services 932, 934, 936 for controlling processor 910. Other hardware or software modules are contemplated. Storage device 930 can be connected to the computing device connection 905. In one aspect, a hardware module that performs a particular function can include the software component stored in a computer-readable medium in connection with the necessary hardware components, such as processor 910, connection 905, output device 935, and so forth, to carry out the function.

Aspects of the present disclosure are applicable to any suitable electronic device (such as security systems, smartphones, tablets, laptop computers, vehicles, drones, or other devices) including or coupled to one or more active depth sensing systems. While described below with respect to a device having or coupled to one light projector, aspects of the present disclosure are applicable to devices having any number of light projectors, and are therefore not limited to specific devices.

The term "device" is not limited to one or a specific number of physical objects (such as one smartphone, one controller, one processing system and so on). As used herein, a device may be any electronic device with one or more parts that may implement at least some portions of this disclosure. While the below description and examples use the term "device" to describe various aspects of this disclosure, the term "device" is not limited to a specific configuration, type, or number of objects. Additionally, the term "system" is not limited to multiple components or specific embodiments. For example, a system may be implemented on one or more printed circuit boards or other substrates, and may have movable or static components. While the below description and examples use the term "system" to describe various aspects of this disclosure, the term "system" is not limited to a specific configuration, type, or number of objects.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general-purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as flash memory, memory or memory devices, magnetic or optical disks, flash memory, USB devices provided with non-volatile memory, networked storage devices, compact disk (CD) or digital versatile disk (DVD), any suitable combination thereof, among others. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, or the like.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors or other suitable electronic circuits) to perform the operation, or any combination thereof.

The phrase "coupled to" refers to any component that is physically connected to another component either directly or indirectly and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative aspects of the disclosure include:

Aspect 1: A method of processing video data. The method comprising: receiving a first image after a previous image; receiving a first segmentation mask associated with the previous image; estimating a first set of forward motion vectors between the previous image and the first image; estimating a reliability of the first set of forward motion vectors; and extrapolating a second segmentation mask associated with the first image using the first set of forward motion vectors and first segmentation mask based on the estimated reliability of the first set of forward motion vectors.

Aspect 2: The method of claim 1, wherein estimating the reliability of the first set of forward motion vectors comprises: determining one or more heuristic statistics based on the first set of forward motion vectors; and evaluating the one or more heuristic statistics to estimate the reliability of the first set of forward motion vectors.

Aspect 3: The method of claim 2, wherein the one or more heuristic statistics comprise at least one of: gradients for one or more motion vectors of the first set of forward motion vectors, or a percent change of a foreground.

Aspect 4: The method of claim 3, wherein evaluating the one or more heuristic statistics comprise at least one of: evaluating the gradients for one or more motion vectors against a gradient threshold value, or estimating the percent change of a foreground based on a threshold value of foreground motion vectors.

Aspect 5: The method of claim 1, further comprising: receiving a second image, wherein the second image is a non-key frame, wherein a segmentation mask machine learning model is configured to generate segmentation masks for key frames; estimating a second set of forward motion vectors between the second image and another previous image; estimating the reliability of the second set of forward motion vectors; and determining to apply a segmentation mask machine learning model to the second image based on an estimate that the second set of forward motion vectors is not reliable.

Aspect 6: The method of claim 1, further comprising labeling one or more portions of the first segmentation mask as part of a foreground or background.

Aspect 7: The method of claim 6, further comprising: detecting an uncovered portion of the first image based on the first set of forward motion vectors; and filling the uncovered portion based on a neighboring background portion of the first segmentation mask and the previous image.

Aspect 8: The method of claim 7, wherein filling the uncovered portion comprises: identifying a motion vector associated with a foreground portion of the first segmentation mask closest to a portion of the uncovered portion; copying the motion vector; and associating the copied motion vector with the portion of the uncovered portion.

Aspect 9: The method of claim 1, wherein the first image is a non-key frame, and wherein a segmentation mask machine learning model is configured to generate segmentation masks for key frames.

Aspect 10: The method of claim 1, further comprising: receiving a third image, wherein the third image is a key frame, wherein a segmentation mask machine learning model is configured to generate segmentation masks for key frames; and applying a segmentation mask machine learning model to the third image.

Aspect 11: An apparatus for processing video data, the apparatus comprising: at least one memory; and at least one processor coupled to the at least one memory, the at least one processor being configured to: receive a first image after a previous image; receive a first segmentation mask associated with the previous image; estimate a first set of forward motion vectors between the previous image and the first image; estimate a reliability of the first set of forward motion vectors; and extrapolate a second segmentation mask associated with the first image using the first set of forward motion vectors and first segmentation mask based on the estimated reliability of the first set of forward motion vectors.

Aspect 12: The apparatus of claim 11, wherein, to estimate the reliability of the first set of forward motion vectors, the at least one processor is further configured to: determine one or more heuristic statistics based on the first set of forward motion vectors; and evaluate the one or more heuristic statistics to estimate the reliability of the first set of forward motion vectors.

Aspect 13: The apparatus of claim 12, wherein the one or more heuristic statistics comprise at least one of: gradients for one or more motion vectors of the first set of forward motion vectors, or a percent change of a foreground.

Aspect 14: The apparatus of claim 13, wherein, to evaluate the one or more heuristic statistics, the at least one processor is further configured to: evaluate the gradients for one or more motion vectors against a gradient threshold value, or estimate the percent change of a foreground based on a threshold value of foreground motion vectors.

Aspect 15: The apparatus of claim 11, wherein the at least one processor is further configured to: receive a second image, wherein the second image is a non-key frame, wherein a segmentation mask machine learning model is configured to generate segmentation masks for key frames; estimate a second set of forward motion vectors between the second image and another previous image; estimate the reliability of the second set of forward motion vectors; and determine to apply a segmentation mask machine learning model to the second image based on an estimate that the second set of forward motion vectors is not reliable.

Aspect 16: The apparatus of claim 11, wherein the at least one processor is further configured to label one or more portions of the first segmentation mask as part of a foreground or background.

Aspect 17: The apparatus of claim 16, wherein the at least one processor is further configured to: detect an uncovered portion of the first image based on the first set of forward motion vectors; and fill the uncovered portion based on a neighboring background portion of the first segmentation mask and the previous image.

Aspect 18: The apparatus of claim 17, wherein, to fill the uncovered portion, the at least one processor is further configured to: identify a motion vector associated with a foreground portion of the first segmentation mask closest to a portion of the uncovered portion; copy the motion vector; and associate the copied motion vector with the portion of the uncovered portion.

Aspect 19: The apparatus of claim 17, wherein the first image is a non-key frame, and wherein a segmentation mask machine learning model is configured to generate segmentation masks for key frames.

Aspect 20: The apparatus of claim 11, wherein the at least one processor is further configured to: receive a third image, wherein the third image is a key frame, wherein a segmentation mask machine learning model is configured to generate segmentation masks for key frames; and apply a segmentation mask machine learning model to the third image.

Aspect 21: A non-transitory computer-readable medium having stored thereon instructions that, when executed by at least one processor, cause the at least one processor to: receive a first image after a previous image; receive a first segmentation mask associated with the previous image; estimate a first set of forward motion vectors between the previous image and the first image; estimate a reliability of the first set of forward motion vectors; and extrapolate a second segmentation mask associated with the first image using the first set of forward motion vectors and first segmentation mask based on the estimated reliability of the first set of forward motion vectors.

Aspect 22: The non-transitory computer-readable medium of claim 21, wherein, to estimate the reliability of the first set of forward motion vectors, the instructions further cause the at least one processor to: determine one or more heuristic statistics based on the first set of forward motion vectors; and evaluate the one or more heuristic statistics to estimate the reliability of the first set of forward motion vectors.

Aspect 23: The non-transitory computer-readable medium of claim 22, wherein the one or more heuristic statistics comprise at least one of: gradients for one or more motion vectors of the first set of forward motion vectors, or a percent change of a foreground.

Aspect 24: The non-transitory computer-readable medium of claim 23, wherein, to evaluate the one or more heuristic statistics, the instructions further cause the at least one processor to: evaluate the gradients for one or more motion vectors against a gradient threshold value, or estimate the percent change of a foreground based on a threshold value of foreground motion vectors.

Aspect 25: The non-transitory computer-readable medium of claim 21, wherein the instructions further cause the at least one processor to: receive a second image, wherein the second image is a non-key frame, wherein a segmentation mask machine learning model is configured to generate segmentation masks for key frames; estimate a second set of forward motion vectors between the second image and another previous image; estimate the reliability of the second set of forward motion vectors; and determine to apply a segmentation mask machine learning model to the second image based on an estimate that the second set of forward motion vectors is not reliable.

Aspect 26: The non-transitory computer-readable medium of claim 21, wherein the instructions further cause the at least one processor to label one or more portions of the first segmentation mask as part of a foreground or background.

Aspect 27: The non-transitory computer-readable medium of claim 26, wherein the instructions further cause the at least one processor to: detect an uncovered portion of the first image based on the first set of forward motion vectors; and fill the uncovered portion based on a neighboring background portion of the first segmentation mask and the previous image.

Aspect 28: The non-transitory computer-readable medium of claim 27, wherein, to fill the uncovered portion, the instructions further cause the at least one processor to: identify a motion vector associated with a foreground portion of the first segmentation mask closest to a portion of the uncovered portion; copy the motion vector; and associate the copied motion vector with the portion of the uncovered portion.

Aspect 29: The non-transitory computer-readable medium of claim 27, wherein the first image is a non-key frame, and wherein a segmentation mask machine learning model is configured to generate segmentation masks for key frames.

Aspect 30: The non-transitory computer-readable medium of claim 21, wherein the instructions further cause the at least one processor to: receive a third image, wherein the third image is a key frame, wherein a segmentation mask machine learning model is configured to generate segmentation masks for key frames; and apply a segmentation mask machine learning model to the third image.

Aspect 31: An apparatus comprising one or more means for performing operations according to any one or more of Aspects 1-10.

What is claimed is:

1. A method for processing video data, the method comprising:
   receiving a first image after a previous image;
   receiving a first segmentation mask associated with the previous image;
   estimating a first set of forward motion vectors between the previous image and the first image;
   estimating a reliability of the first set of forward motion vectors; and
   extrapolating a second segmentation mask associated with the first image using the first set of forward motion vectors and the first segmentation mask based on the estimated reliability of the first set of forward motion vectors.

2. The method of claim 1, wherein estimating the reliability of the first set of forward motion vectors comprises:
   determining one or more heuristic statistics based on the first set of forward motion vectors; and
   evaluating the one or more heuristic statistics to estimate the reliability of the first set of forward motion vectors.

3. The method of claim 2, wherein the one or more heuristic statistics comprise at least one of:
   gradients for one or more motion vectors of the first set of forward motion vectors, or
   a percent change of a foreground.

4. The method of claim 3, wherein evaluating the one or more heuristic statistics comprise at least one of:
   evaluating the gradients for one or more motion vectors against a gradient threshold value, or
   estimating the percent change of a foreground based on a threshold value of foreground motion vectors.

5. The method of claim 1, further comprising:
   receiving a second image, wherein the second image is a non-key frame, wherein a segmentation mask machine learning model is configured to generate segmentation masks for key frames;
   estimating a second set of forward motion vectors between the second image and another previous image;
   estimating the reliability of the second set of forward motion vectors; and
   determining to apply a segmentation mask machine learning model to the second image based on an estimate that the second set of forward motion vectors is not reliable.

6. The method of claim 1, further comprising labeling one or more portions of the first segmentation mask as part of a foreground or background.

7. The method of claim 6, further comprising:
   detecting an uncovered portion of the first image based on the first set of forward motion vectors; and
   filling the uncovered portion based on a neighboring background portion of the first segmentation mask and the previous image.

8. The method of claim 7, wherein filling the uncovered portion comprises:
   identifying a motion vector associated with a foreground portion of the first segmentation mask closest to a portion of the uncovered portion;
   copying the motion vector; and
   associating the copied motion vector with the portion of the uncovered portion.

9. The method of claim 1, wherein the first image is a non-key frame, and wherein a segmentation mask machine learning model is configured to generate segmentation masks for key frames.

10. The method of claim 1, further comprising:
    receiving a third image, wherein the third image is a key frame, wherein a segmentation mask machine learning model is configured to generate segmentation masks for key frames; and
    applying a segmentation mask machine learning model to the third image.

11. An apparatus for processing video data, the apparatus comprising:
    at least one memory; and
    at least one processor coupled to the at least one memory, the at least one processor being configured to:
    receive a first image after a previous image;
    receive a first segmentation mask associated with the previous image;
    estimate a first set of forward motion vectors between the previous image and the first image;
    estimate a reliability of the first set of forward motion vectors; and
    extrapolate a second segmentation mask associated with the first image using the first set of forward motion vectors and the first segmentation mask based on the estimated reliability of the first set of forward motion vectors.

12. The apparatus of claim 11, wherein, to estimate the reliability of the first set of forward motion vectors, the at least one processor is further configured to:
    determine one or more heuristic statistics based on the first set of forward motion vectors; and
    evaluate the one or more heuristic statistics to estimate the reliability of the first set of forward motion vectors.

13. The apparatus of claim 12, wherein the one or more heuristic statistics comprise at least one of:
    gradients for one or more motion vectors of the first set of forward motion vectors, or
    a percent change of a foreground.

14. The apparatus of claim 13, wherein, to evaluate the one or more heuristic statistics, the at least one processor is further configured to:
    evaluate the gradients for one or more motion vectors against a gradient threshold value, or
    estimate the percent change of a foreground based on a threshold value of foreground motion vectors.

15. The apparatus of claim 11, wherein the at least one processor is further configured to:
    receive a second image, wherein the second image is a non-key frame, wherein a segmentation mask machine learning model is configured to generate segmentation masks for key frames;
    estimate a second set of forward motion vectors between the second image and another previous image;
    estimate the reliability of the second set of forward motion vectors; and
    determine to apply a segmentation mask machine learning model to the second image based on an estimate that the second set of forward motion vectors is not reliable.

16. The apparatus of claim 11, wherein the at least one processor is further configured to label one or more portions of the first segmentation mask as part of a foreground or background.

17. The apparatus of claim 16, wherein the at least one processor is further configured to:

detect an uncovered portion of the first image based on the first set of forward motion vectors; and fill the uncovered portion based on a neighboring background portion of the first segmentation mask and the previous image.

18. The apparatus of claim 17, wherein, to fill the uncovered portion, the at least one processor is further configured to:

identify a motion vector associated with a foreground portion of the first segmentation mask closest to a portion of the uncovered portion;

copy the motion vector; and associate the copied motion vector with the portion of the uncovered portion.

19. The apparatus of claim 17, wherein the first image is a non-key frame, and wherein a segmentation mask machine learning model is configured to generate segmentation masks for key frames.

20. The apparatus of claim 11, wherein the at least one processor is further configured to:

receive a third image, wherein the third image is a key frame, wherein a segmentation mask machine learning model is configured to generate segmentation masks for key frames; and apply a segmentation mask machine learning model to the third image.

21. A non-transitory computer-readable medium having stored thereon instructions that, when executed by at least one processor, cause the at least one processor to:

receive a first image after a previous image;

receive a first segmentation mask associated with the previous image;

estimate a first set of forward motion vectors between the previous image and the first image;

estimate a reliability of the first set of forward motion vectors; and extrapolate a second segmentation mask associated with the first image using the first set of forward motion vectors and the first segmentation mask based on the estimated reliability of the first set of forward motion vectors.

22. The non-transitory computer-readable medium of claim 21, wherein, to estimate the reliability of the first set of forward motion vectors, the instructions further cause the at least one processor to:

determine one or more heuristic statistics based on the first set of forward motion vectors; and evaluate the one or more heuristic statistics to estimate the reliability of the first set of forward motion vectors.

23. The non-transitory computer-readable medium of claim 22, wherein the one or more heuristic statistics comprise at least one of:

gradients for one or more motion vectors of the first set of forward motion vectors, or a percent change of a foreground.

24. The non-transitory computer-readable medium of claim 23, wherein, to evaluate the one or more heuristic statistics, the instructions further cause the at least one processor to:

evaluate the gradients for one or more motion vectors against a gradient threshold value, or estimate the percent change of a foreground based on a threshold value of foreground motion vectors.

25. The non-transitory computer-readable medium of claim 21, wherein the instructions further cause the at least one processor to:

receive a second image, wherein the second image is a non-key frame, wherein a segmentation mask machine learning model is configured to generate segmentation masks for key frames;

estimate a second set of forward motion vectors between the second image and another previous image;

estimate the reliability of the second set of forward motion vectors; and determine to apply a segmentation mask machine learning model to the second image based on an estimate that the second set of forward motion vectors is not reliable.

26. The non-transitory computer-readable medium of claim 21, wherein the instructions further cause the at least one processor to label one or more portions of the first segmentation mask as part of a foreground or background.

27. The non-transitory computer-readable medium of claim 26, wherein the instructions further cause the at least one processor to:

detect an uncovered portion of the first image based on the first set of forward motion vectors; and fill the uncovered portion based on a neighboring background portion of the first segmentation mask and the previous image.

28. The non-transitory computer-readable medium of claim 27, wherein, to fill the uncovered portion, the instructions further cause the at least one processor to:

identify a motion vector associated with a foreground portion of the first segmentation mask closest to a portion of the uncovered portion;

copy the motion vector; and associate the copied motion vector with the portion of the uncovered portion.

29. The non-transitory computer-readable medium of claim 27, wherein the first image is a non-key frame, and wherein a segmentation mask machine learning model is configured to generate segmentation masks for key frames.

30. The non-transitory computer-readable medium of claim 21, wherein the instructions further cause the at least one processor to:

receive a third image, wherein the third image is a key frame, wherein a segmentation mask machine learning model is configured to generate segmentation masks for key frames; and apply a segmentation mask machine learning model to the third image.

* * * * *